US009522767B1

(12) United States Patent
Pass

(10) Patent No.: US 9,522,767 B1
(45) Date of Patent: Dec. 20, 2016

(54) TAILGATE COVER

(71) Applicant: Melissa Pass, Flat Rock, AL (US)

(72) Inventor: Melissa Pass, Flat Rock, AL (US)

(*) Notice: Subject to any disclaimer, the term of this patent is extended or adjusted under 35 U.S.C. 154(b) by 0 days.

(21) Appl. No.: 14/023,072

(22) Filed: Sep. 10, 2013

Related U.S. Application Data

(60) Provisional application No. 61/698,786, filed on Sep. 10, 2012.

(51) Int. Cl.
*B60R 9/06* (2006.01)
*B60J 11/06* (2006.01)
*B65D 33/14* (2006.01)
*B60R 11/00* (2006.01)

(52) U.S. Cl.
CPC .............. *B65D 33/14* (2013.01); *B60R 9/06* (2013.01); *B60J 11/06* (2013.01); *B60R 2011/0059* (2013.01)

(58) Field of Classification Search
USPC ................................................ 224/402–404
See application file for complete search history.

(56) References Cited

U.S. PATENT DOCUMENTS

| | | | | |
|---|---|---|---|---|
| 4,531,560 A * | 7/1985 | Balanky | .................. | B60J 11/06 150/166 |
| 4,849,272 A * | 7/1989 | Haney | ..................... | B25H 5/00 280/770 |
| D323,639 S * | 2/1992 | Creamer | ..................... | D12/401 |
| 5,255,464 A * | 10/1993 | Marecek | ......................... | 40/591 |
| 5,799,975 A * | 9/1998 | Crick | ...................... | B25H 3/04 150/166 |
| 5,849,390 A * | 12/1998 | Dillon | ...................... | B60R 7/00 150/166 |
| D433,661 S * | 11/2000 | Hanson | ......................... | D12/401 |
| 6,273,504 B1 * | 8/2001 | Pace et al. | ................. | 297/219.1 |
| 6,286,885 B1 * | 9/2001 | Ramos | ......................... | 296/57.1 |
| 6,484,427 B1 * | 11/2002 | Santa Cruz et al. | ............ | 40/591 |
| 6,749,250 B1 * | 6/2004 | Reid | ........................ | 296/136.07 |
| 6,821,600 B1 * | 11/2004 | Henson | ........................... | 428/99 |
| 7,000,810 B1 * | 2/2006 | Farmer | ......................... | 224/404 |
| 7,374,240 B2 * | 5/2008 | Gold | ..................... | A47C 31/11 297/188.01 |
| D596,890 S * | 7/2009 | Sulier | ........................... | D6/610 |
| 8,061,761 B1 * | 11/2011 | Sierra | ...................... | 296/136.01 |
| D669,838 S * | 10/2012 | Valenta et al. | ............... | D12/403 |
| D669,839 S * | 10/2012 | Valenta et al. | ............... | D12/403 |

(Continued)

*Primary Examiner* — Justin Larson
(74) *Attorney, Agent, or Firm* — Maynard Cooper & Gale, P.C.; Jon E. Holland

(57) ABSTRACT

The present disclosure generally pertains to a cover for a pickup truck tailgate. The cover is generally rectangular in shape and comprises a top portion, a bottom portion which hangs downward form the rear of the pickup truck, and at least one device for attaching the cover to the pickup truck tailgate. The bottom portion further includes at least one pocket for storing various implements, for instance those used during tailgating. The cover may be attached directly to the pickup truck with straps or other similar devices, and/or with magnets which will adhere to the truck bed or tailgate. The bottom may include graphics which may be observed from the rear of the pickup truck. The present disclosure also contemplates methods for securing the tailgate cover to a pickup truck.

12 Claims, 6 Drawing Sheets

(56) References Cited

U.S. PATENT DOCUMENTS

| | | | |
|---|---|---|---|
| 8,291,814 B2 * | 10/2012 | Weigelt | A47J 37/0786 |
| | | | 114/361 |
| 9,126,541 B2 * | 9/2015 | Goldstein | B60R 13/01 |
| 2003/0038497 A1 * | 2/2003 | Fitzgerald | 296/39.1 |
| 2005/0028912 A1 * | 2/2005 | Schnarr | 150/166 |
| 2005/0230443 A1 * | 10/2005 | Bredeson | B60R 7/043 |
| | | | 224/275 |
| 2005/0275241 A1 * | 12/2005 | Rothwell | B60R 11/00 |
| | | | 296/136.01 |
| 2008/0203752 A1 * | 8/2008 | Warkentin | 296/57.1 |
| 2013/0220185 A1 * | 8/2013 | Valenta et al. | 108/90 |

\* cited by examiner

TAILGATE COVER

CROSS REFERENCE TO RELATED APPLICATION

This application claims priority to U.S. Provisional Patent Application No. 61/698,786, entitled "Tailgate Cover" and filed on Sep. 10, 2012, which is incorporated herein by reference.

RELATED ART

Tailgating is a tradition among sports fans. In addition to spending time with family and friends, fans also enjoy showing their support for a favorite team. Tailgating often involves using a vehicle, particularly a truck, to hold party supplies and equipment. The use of sheets or covers is desirable to protect the inside cargo area of truck bed or tailgate from scratches or other damage. These covers also provide a convenient way for an individual to show allegiance to a particular team or club. What is needed is a tailgate cover which provides protection for the tailgate and truck bed, a space to organize tailgate supplies, and an area for text or pictures. What is also needed is a cover that is easy to install and will not detach during use.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
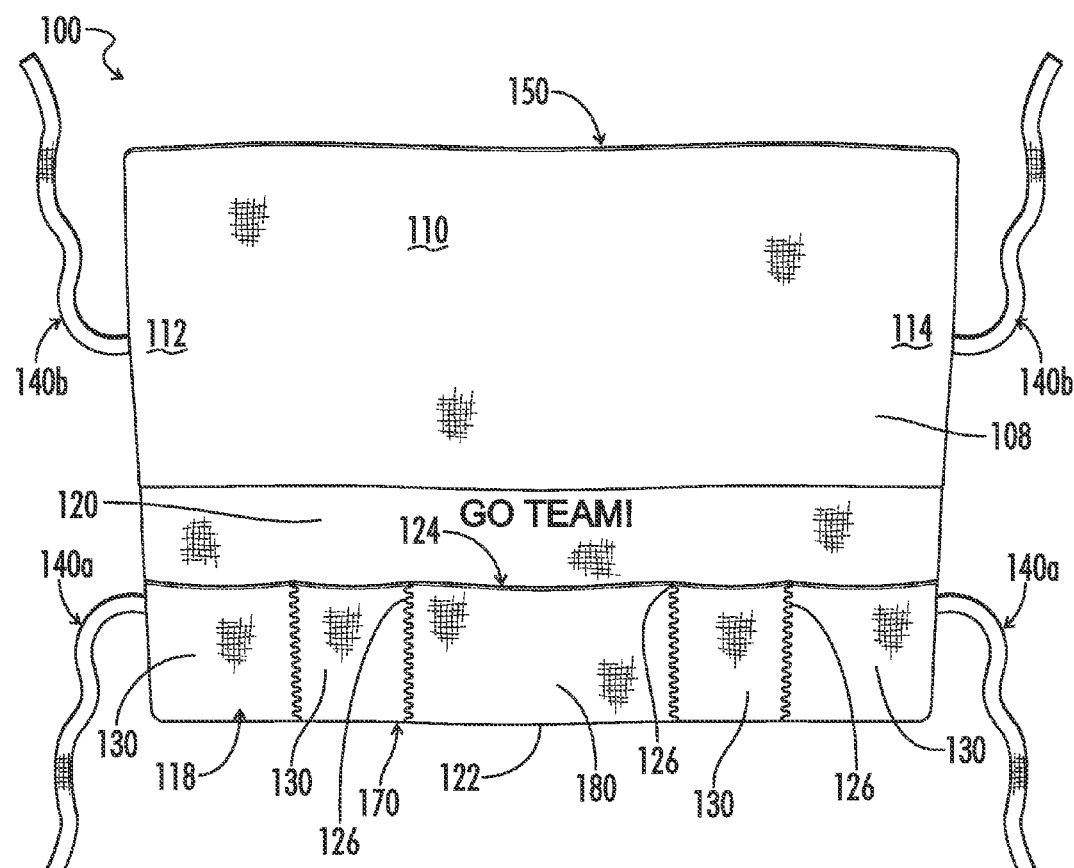
FIG. 1 is a front view of tailgate cover in one embodiment of the disclosure.
Figure 2A:
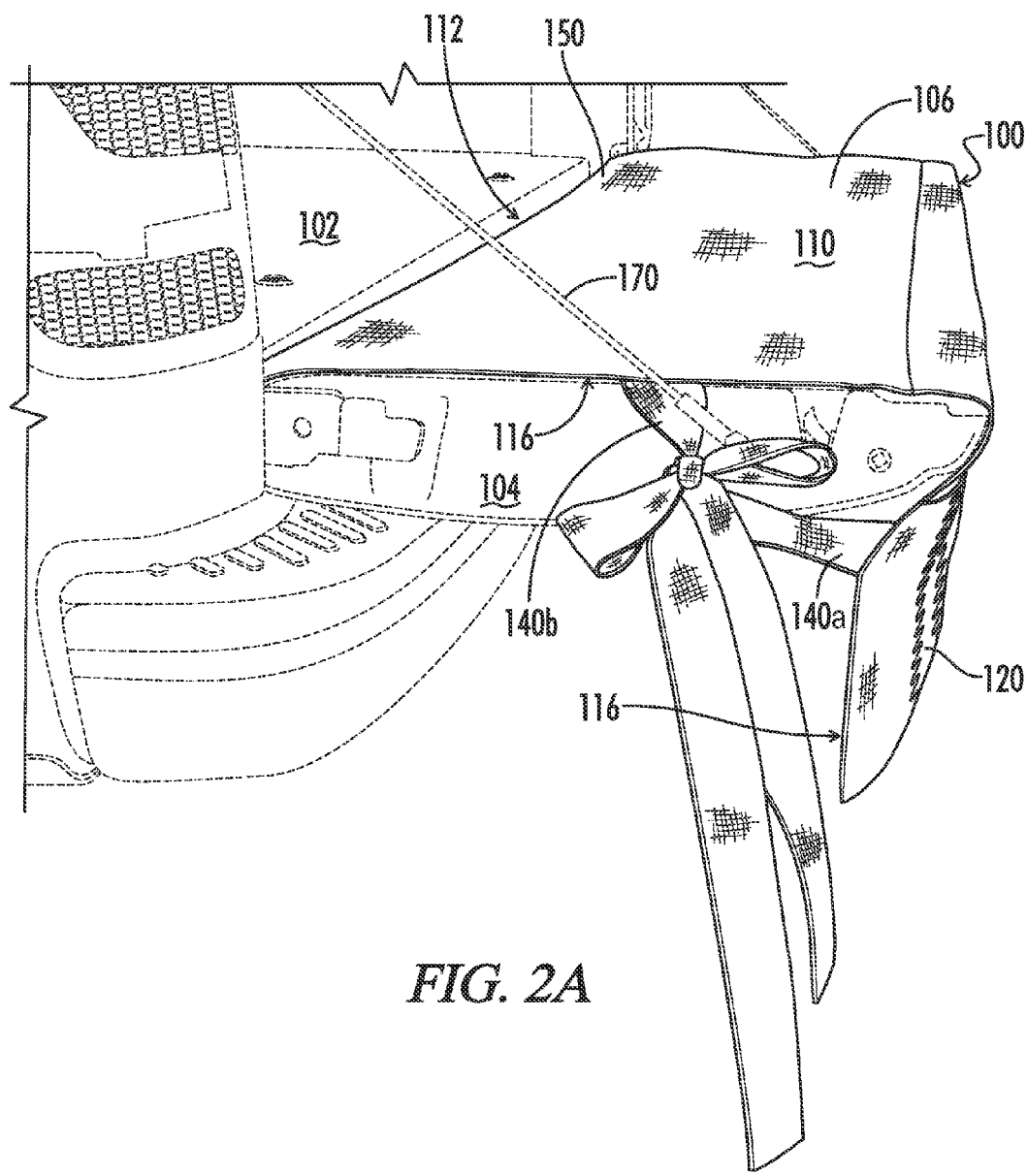
FIG. 2A is a side view of the tailgate cover depicted by FIG. 1 installed onto the tailgate in one embodiment of the disclosure.

The present disclosure is related to covers for tailgates of pickup trucks or other vehicles. As used herein, a tailgate generally refers to the door or gate at the back of a wagon, pickup truck, SUV or other similar type of vehicle that is hinged at its bottom and can be opened for convenience in loading cargo into the rear of the vehicle. FIG. 1 illustrates a tailgate cover 100 including a top portion 110 and a bottom portion 120. In this embodiment, the top portion 110, and the bottom portion 120 are generally rectangular shaped, forming a rectangular-shaped cover 100. Other shapes are contemplated by the present disclosure, for instance square-shaped tailgate covers 100. FIG. 2A illustrates the tailgate cover 100 installed on a conventional pickup truck 200. Truck 200 includes a truck bed 102 and a tailgate 104, which is hinged at its bottom such that the tailgate 104 can be lowered to an open position. As illustrated in FIG. 2A, the top portion 110 of tailgate cover 100 is placed on a top side 106 of an opened tailgate 104 while the bottom portion 120 hangs downward from the opened tailgate 104. In this embodiment, the bottom portion 120 extends downward from the tailgate 104 for viewing. In this regard, when tailgate cover 100 is secured in place, the bottom section 120 is visible to those behind the truck.

In one embodiment, the tailgate cover 100 is constructed from a soft, flexible material, for instance fabric (e.g., cotton, polyester, etc.). The material is flexible such that it will fit over and conform to the dimensions of the truck bed 102 and tailgate 104. The tailgate cover 100 may be constructed of other materials, for instance a soft plastic which exhibits sufficient flexibility to conform to the tailgate 104 during application.

In the embodiment illustrated in FIGS. 1 and 2A, tailgate cover 100 includes a front surface 108 incorporating at least one pocket 130 located on the bottom portion 120, though having a pocket 130 is unnecessary in other embodiments. The pocket 130 is sewn into the bottom portion 120 of the tailgate cover 100, but the pocket 130 may be attached to the tailgate cover 100 via other techniques on other embodiments. In the illustrated embodiment, a top material 170 is secured to the front face 118 of bottom portion 120 along opposing sides 112 and 114 and lower edge 122. Attaching top material 170 to the bottom portion 120 may be accomplished, in one embodiment, through stitching or sewing the edges. Other forms of attachment are available in the art, including the use of hooks or adhesives. Attachment in this manner creates an opening 124 between the bottom portion 120 and top material 170 which defines pocket 130. Top material 170 may be attached to bottom portion 120 in additional locations 126 to create multiple pockets 130. Location of pockets 130 on front face 118, which hangs downward from open tailgate 104 at the back of the truck (FIG. 2), allows for the convenient storage of materials commonly used in tailgating, such as cooking implements, TV remotes, vehicle keys, etc. Use of the pockets 130 also prevents misplacement of these items. In an additional embodiment, pockets 130 may be assembled separately from the tailgate cover 100 using methods known in the art. The pockets 120 may then be secured to bottom portion 120 of tailgate cover 100 using varied methods known in the art, for instance by stitching or the use of hooks or adhesives.

Referring again to FIG. 1, the tailgate cover 100 includes two opposing sides 112 and 114 located adjacent to the upper portion 110 and bottom portion 120. Fixed to at least one of the opposing sides 112 and 114 is at least one attachment device to help secure the tailgate cover 100 to the truck bed 102 and/or the tailgate 104. The attachment device may include a tie, clip, hook, strap, belt, snap, rope or other material used to secure tailgate cover 100 to the truck bed 102 or tailgate 104. In the embodiment illustrated in FIG. 2A, the attachment device includes straps 140a and 140b. In the embodiment illustrated in FIGS. 1 and 2, straps 140a and 140b include at least one strip of material extending from tailgate cover 100. The material may be constructed from the same material as the tailgate cover 100, or may comprise a different material which is joined to the cover 100. Likewise, straps 140a and 140b may be an extension of tailgate cover 100, or may be a separate component which is secured to the sides of tailgate cover 100 by known methods, such as by stitching or use of an adhesive.

Figure 2B:
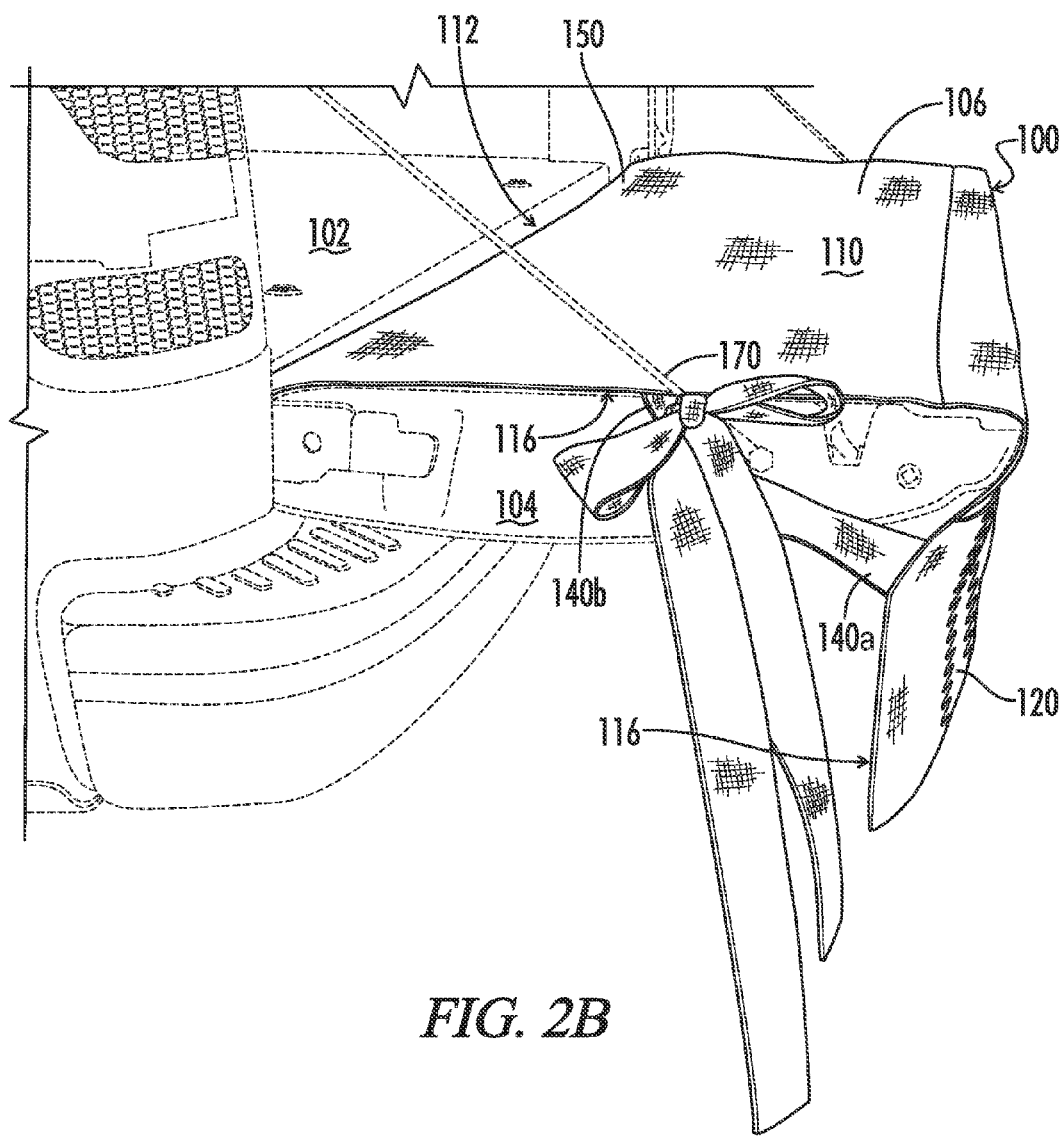
FIG. 2B is an additional side view of the tailgate cover depicted by FIG. 1 installed onto the tailgate in one embodiment of the disclosure.
Figure 2C:
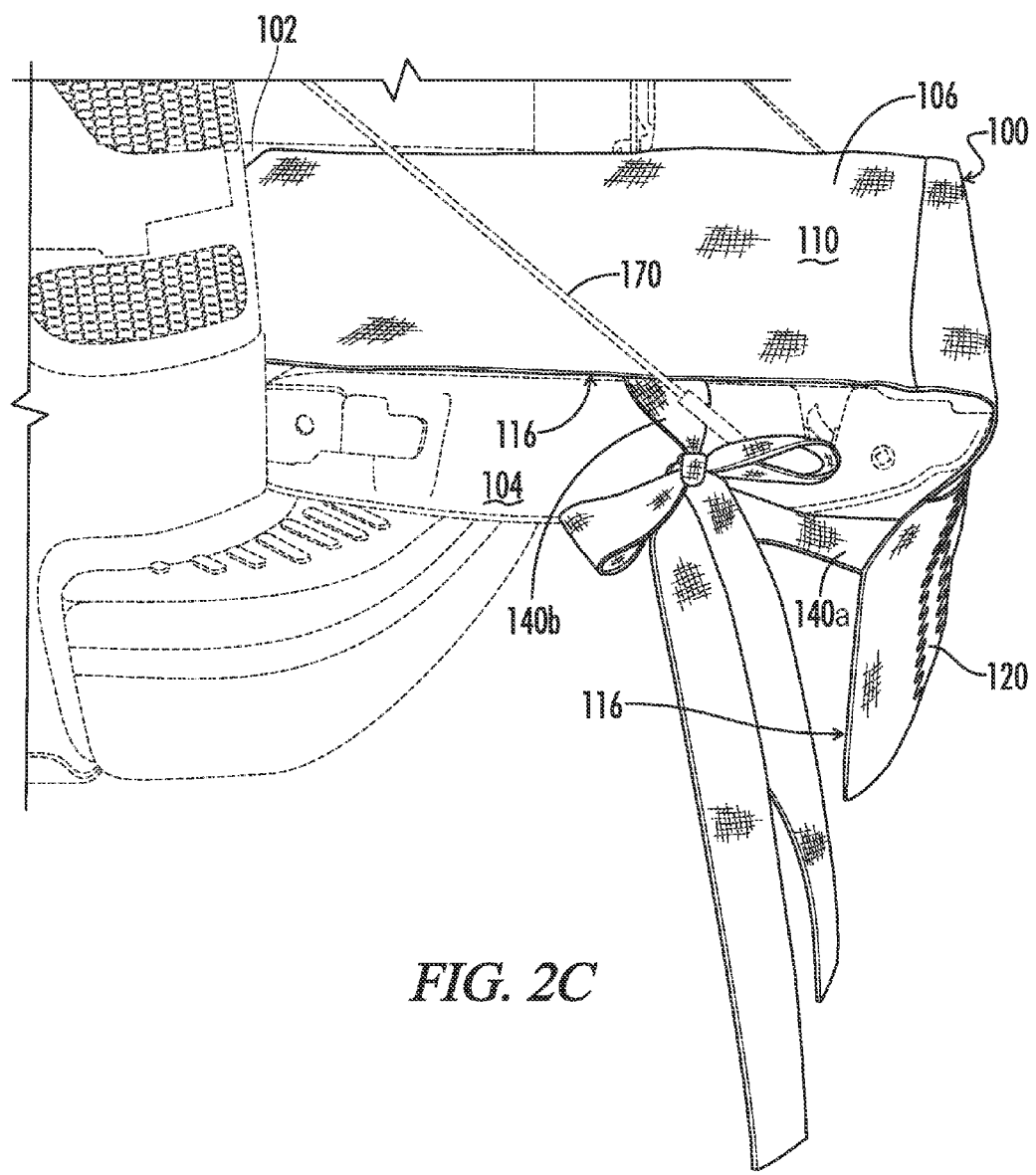
FIG. 2C is a side view of the tailgate cover depicted by FIG. 1 installed onto the tailgate and covering a portion of the truck bed in one embodiment of the disclosure.
Figure 3:
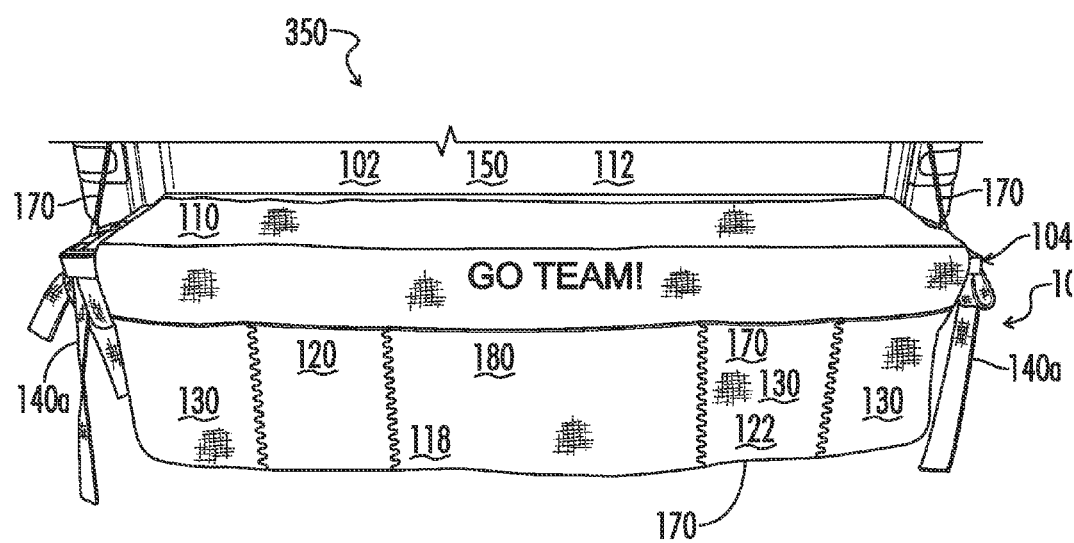
FIG. 3 is a view of the tailgate cover depicted by FIG. 2.

Straps 140a and 140b may be secured to the truck bed 102 or tailgate 104 in any manner so as to help prevent tailgate cover 100 from sliding off of the tailgate 104. In one embodiment, only the top portion 110 of cover 100 is secured to the truck bed 102 or tailgate 104 through use of straps 140b. Referring to FIGS. 1 and 2A, straps 140b extend from top portion 110 of cover 100. In this embodiment, straps 140b are be directly secured to certain structures found on the truck bed 102 or tailgate 104. Some truck beds and tailgates have hooks or loops to receive attachment devices. In one embodiment (not shown), strap 140b is secured to such hooks or loops, thus helping to prevent slippage of the tailgate cover 100. However, it may be desirable to secure the tailgate cover 100 to the truck 200 in more than one location to better prevent displacement, for instance during inclement weather. Referring again to FIG. 1, cover 100 may include additional straps 140a located on the bottom portion 120 of cover 100. In one embodiment illustrated in FIG. 2A, straps 140b, positioned at the top portion 110 of the cover 100, are secured to the straps 140a, positioned at the bottom portion 120 of the cover 100. The straps 140a and 140b may be secured by tying the ends of the straps together, for instance in a bow. Such an arrangement secures both the top portion 110 and bottom portion 120 to tailgate 104 and helps to prevent slippage of the tailgate cover 100. In an additional embodiment illustrated in FIG. 2B, straps 140a and 140b are tied together and form a loop through which arm 250 passes. Arm 250 extends from the truck bed 102 to the tailgate 104 and supports tailgate 104. Either strap 140a or 140b or both straps 140a and 140b may loop around arm 250, providing for additional stability when attaching the cover 100 to the vehicle. Other methods of securing the ends of attachment devices 104A and 104B are known in the art, for instance through the use of Velcro. Straps 140a and 140b may be untied or separated so that the tailgate cover is easily removed from the vehicle when desired. When secured in the above-described position, the bottom portion 104 will hang downward from the tailgate 104 for viewing (FIGS. 2A-2C). When tailgate cover 100 is secured in place, the bottom section is visible to those behind the truck as shown by FIG. 3.

Figure 4:
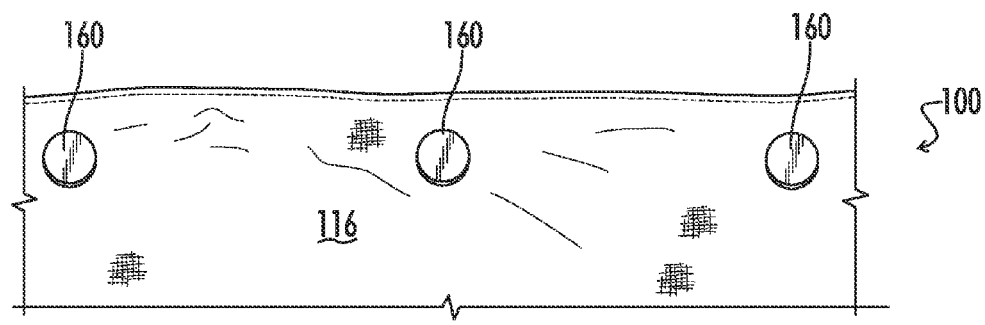
FIG. 4 is an illustration of magnets used to secure a tailgate cover in one embodiment of the disclosure.

In the embodiments illustrated in FIGS. 2A and 2C, the top portion 110 of tailgate cover 100 extends only to the gap 112 gap formed between the tailgate 104 and the truck bed 102. In the embodiment illustrated in FIGS. 2A, 2B and 3, the top edge 150 of tailgate cover 100 is secured in gap 112 by forcing this edge into the gap. This helps to prevent tailgate cover 100 from slipping off of tailgate 104 and also helps to fill in gap 112 to prevent implements from falling through gap 112. In another embodiment, top edge 150 may be non-permanently secured to the truck bed 102 or tailgate 104 using an additional attachment device. For instance, magnets 160 (FIG. 4) may be secured along the underside 116 of tailgate cover 100. The tailgate 104 and truck bed 102 are constructed from a metallic material. The metallic material will attract the magnets 160 to the tailgate 104 or truck bed 102 on which they are positioned. The magnets 160 will non-permanently adhere to the metal surface of the truck bed 102 or the tailgate 104, thus preventing slippage of tailgate cover 100. Magnets 160 may be secured directly to the underside 116 of cover 100 (FIG. 4) by use of, for example, an adhesive. In an alternate embodiment, magnets 160 may be secured to the underside 116 of top edge 150 and covered by a piece of fabric or enclosed within a pocket (not shown) or otherwise within the fabric of the tailgate cover 100. Covering the surface of magnets 160 prevents them from scratching or otherwise damaging truck bed 102 or tailgate 104 but still allows for the magnets 160 to non-permanently adhere to the metallic material of truck bed 102 or tailgate 104 and prevent slippage of the tailgate cover 100. It is to be understood that other methods of securing the top portion 110 of the tailgate cover 100 may be utilized, such as the placement of additional attachment devices along the top edge 150. In an additional embodiment, magnets 160 may be used in conjunction with straps 140a and 140b to secure the tailgate cover 100 to the truck.

In an additional embodiment illustrated in FIG. 2B, the upper portion 110 of tailgate cover 100 extends past the tailgate 104 and partially into the truck bed 102. In this embodiment, the tailgate cover 100 covers the gap 112 between the tailgate 102 and the truck bed 104. Placement of the tailgate cover 100 in this orientation helps to prevent items from falling into a gap 112 between the truck bed 104 and the tailgate. In this embodiment, additional attachment devices, for example magnets 160, may be secured to the underside 116 of top edge 150 as described above. The metallic material of the tailgate 104 will attract the magnets 160 to its surface. The magnets 160 will non-permanently adhere to the metal surface of the truck bed 102, thus preventing slippage of tailgate cover 100.

In an additional embodiment, the tailgate cover 100 contains graphics 180 (FIG. 1). Referring to FIG. 1, the graphics 180 may in one example be placed on the front face 118 of the bottom portion 120 of tailgate cover 100. These graphics can include a team logo, text, pictures, etc. The graphics can be placed on the front face 118 of tailgate cover 100 by, for example, sewing, printing, embroidery or the use of adhesives.

An exemplary use of the tailgate cover 100 will now be described below. Initially, a top portion 110 of the tailgate cover 100 is placed over the tailgate 104 such that a bottom portion 120 extends over the edge of the tailgate 104 and hangs downward from the tailgate 104 for viewing. As described in detail above, the bottom portion 120 is visible to those behind the truck when in this position, and the bottom portion 120 has a least one pocket 130. The tailgate cover 100 is non-permanently secured to the tailgate and/or truck bed. In one embodiment, the top portion 110 of tailgate cover is secured to the tailgate 104. This may be accomplished by securing straps 140b to certain structures found on the truck bed 102 or tailgate 104. In an additional embodiment, straps 104b may be secured to straps 140a (positioned on bottom portion 120 of cover 100) by tying their ends together in a loop or bow. In another embodiment, an arm 250 securing tailgate 104 to truck bed 102 passes through the loop created by securing straps 104b to straps 140a. The top edge 150 of upper portion 110 may also be non-permanently secured to the truck bed 102 or tailgate 104 through the use of attachment devices. In one embodiment, top edge 150 us secured through use of magnets 160. Thus, the tailgate cover 100 may be attached to the truck 200 through the use of a combination of straps 140a and 140b and magnets 160. In an additional embodiment, the tailgate cover 100 contains graphics 180 placed on the front face 118 of the upper portion 110 or lower portion 120.

FIG. 3 depicts an embodiment of the presently described system for holding supplies. As shown by FIG. 3, system 350 comprises a vehicle having a tailgate, exemplified here as a pickup truck 200 with a lowered tailgate 104. The system 350 further includes a tailgate cover 100 having a top portion 100 and a bottom portion 120. The cover 100 contains at least one attachment device for securing the cover 100 to the tailgate 104 of the pickup truck 200. The cover 100 is positioned such that the bottom portion 120 hangs from the edge of the tailgate 104. In one embodiment of the system 350, only the top portion 110 of cover 100 is secured to the truck bed 102 or tailgate 104 through use of straps 140b. In this embodiment, straps 140b are be directly secured to certain structures found on the truck bed 102 or tailgate 104. In an additional embodiment, the system 350 may include a cover 100 with additional straps 140a located on the bottom portion 120. In this embodiment, straps 140b, positioned at the top portion 110 of the cover 100, are secured to the straps 140a, positioned at the bottom portion 120 of the cover 100. The straps 140a and 140b may be secured by tying the ends of the straps together, for instance in a bow. They straps 140a and 140b may be tied together and form a loop through which arm 250 passes.

In another embodiment of the presently disclosed system 350, cover 100 includes a top edge 150 which may be non-permanently secured to the truck bed 102 or tailgate 104 using an additional attachment device. In this embodiment, magnets 160 may be secured along the underside 116 of tailgate cover 100. The magnets 160 will non-permanently adhere to the metal surface of the truck bed 102 or the tailgate 104, thus preventing slippage of tailgate cover 100.

Figure 5:
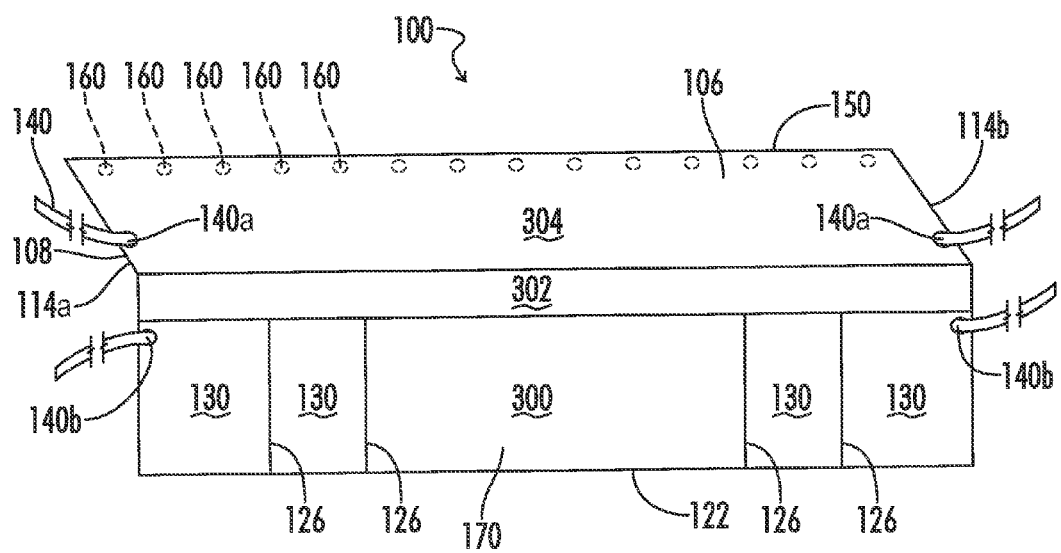
FIG. 5 is an illustration of exemplary dimensions of a tailgate cover in one embodiment of the disclosure.

FIG. 5 describes various embodiments of the presently described tailgate cover 100, including in some cases dimensions. It should be emphasized that such embodiments and dimensions are exemplary. Indeed, many variations and modifications to such embodiments and dimensions are possible and would be apparent to a person of ordinary skill upon reading this disclosure. Here, an exemplary tailgate cover 100 is sized to fit a standard full-sized pickup truck 200. Fabric sections (300, 302 and 304) and pocket sections (306, 308, 310 and 312) are sized as indicated and may be selected from any color or design as desired by the user. In one embodiment, the fabric colors and designs are selected to reflect those of a sport team to which the user supports. Attachment devices 140a and 140b may be constructed, for example, from any of the materials comprising the fabric sections (300, 302 and 304) and pocket sections (306, 308, 310 and 312). In one embodiment, the tailgate cover 100 may also comprises magnets 160. The fabric sections (300, 302 and 304) and pocket sections (306, 308, 310 and 312) may also include additional materials, such as sheeting or other types of liners, to provide for greater durability.

It should be noted that the embodiments described above are exemplary, and it would be apparent to one of ordinary skill in the art, upon reading this disclosure, that various modifications of the above described embodiments are possible.

Now, therefore, the following is claimed:

1. A system for holding supplies, comprising:
a vehicle having a tailgate attached to an arm of the vehicle; and
a tailgate cover having a top portion, a bottom portion, and at least one attachment device, the top portion positioned on the tailgate and secured to the vehicle via the attachment device such that the bottom portion hangs from an edge of the tailgate, wherein the bottom portion hanging from the edge has at least one pocket on an exterior surface of the bottom portion for receiving items for storage in the pocket while the bottom is hanging from the edge, wherein the attachment device comprises a first strap extending from the top portion and a second strap extending from the bottom portion, wherein the first strap is attached to the second strap, and wherein the first strap and the second strap form a loop through which the arm passes.

2. The system of claim 1, wherein the tailgate cover has an edge and a plurality of magnets, and wherein the plurality of magnets are positioned along the edge.

3. The system of claim 1, wherein the tailgate cover has at least one magnet for securing the tailgate cover to the vehicle.

4. The system of claim 3, wherein the magnet is embedded in the tailgate cover.

5. The system of claim 1, wherein the tailgate cover has a plurality of magnets for securing the tailgate cover to the vehicle via magnetic forces between the plurality of magnets and a metallic surface of the vehicle.

6. The system of claim 5, wherein the magnets are embedded in the tailgate cover.

7. The system of claim 1, wherein the tailgate cover has at least one magnet for securing the tailgate cover to the vehicle via magnetic force between the magnet and a metallic surface of the vehicle.

8. The system of claim 7, wherein the first strap and the second strap are tied together.

9. A method, comprising:
positioning a tailgate cover on a tailgate of a vehicle such that a top portion of the tailgate cover is positioned on the tailgate and a bottom portion of the tailgate cover hangs from an edge of the tailgate, wherein the bottom portion has at least one pocket for receiving items for storage in the pocket while the bottom is hanging from the edge; and
securing the tailgate cover to the vehicle, wherein the wherein the securing the tailgate cover to the vehicle comprises attaching a first strap of the tailgate cover to a second strap of the tailgate cover such that the first strap and the second strap form a loop through which an arm of the vehicle passes, and wherein the first strap extends from a top portion of the tailgate cover and the second strap extends from a bottom portion of the tailgate cover.

10. The method of claim 9, wherein the tailgate cover has an edge and a plurality of magnets, and wherein the plurality of magnets are positioned along the edge.

11. The method of claim 9, wherein securing of the tailgate cover to the vehicle comprises securing at least one magnet to the vehicle.

12. The method of claim 11, wherein the magnet is embedded in the tailgate cover.

* * * * *